(12) United States Patent
Devaney

(10) Patent No.: US 6,453,957 B1
(45) Date of Patent: Sep. 24, 2002

(54) CUTTING ATTACHMENT

(75) Inventor: Charles E. Devaney, Jordan, MN (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/641,300

(22) Filed: Aug. 18, 2000

Related U.S. Application Data

(60) Provisional application No. 60/150,203, filed on Aug. 20, 1999.

(51) Int. Cl.$^7$ .............................................. A01G 23/08
(52) U.S. Cl. ....................... 144/34.1; 144/336; 144/4.1; 144/34.5; 144/339; 56/13.9; 56/504; 56/13.6
(58) Field of Search ................................ 144/4.1, 34.1, 144/34.5, 336, 339; 56/13.6, 13.7, 13.9, 295, 504

(56) References Cited

U.S. PATENT DOCUMENTS

| | | | |
|---|---|---|---|
| 2,529,934 A | 11/1950 | Gracey et al. .............. | 144/34.1 |
| 3,364,964 A | 1/1968 | Lacey ........................ | 144/34.1 |
| 3,996,980 A * | 12/1976 | Pallarl ..................... | 56/13.9 X |
| 4,384,444 A | 5/1983 | Rossler, Jr. ................... | 56/13.6 |
| 4,445,557 A | 5/1984 | Peters, III ................... | 144/336 |
| 4,467,849 A | 8/1984 | Denis .......................... | 144/34 |
| 4,592,398 A * | 6/1986 | Golob et al. ................ | 144/34.1 |
| 4,749,048 A | 6/1988 | Kelly .......................... | 172/699 |
| 5,048,579 A | 9/1991 | Lloyd ....................... | 144/24.12 |
| 5,503,201 A | 4/1996 | Strickland et al. ......... | 144/34.1 |
| 5,642,765 A | 7/1997 | Brown ....................... | 144/34.1 |

* cited by examiner

*Primary Examiner*—W. Donald Bray
(74) *Attorney, Agent, or Firm*—Westman, Champlin & Kelly, P.A.

(57) ABSTRACT

A cutting attachment is adapted to be mounted onto a vehicle, such as a skid steer loader, and includes a frame that is generally "V" shaped with diverging walls and open in direction of travel. The diverging walls of the frame support upright shafts. Each of the shafts has a rotating disk on the lower end thereof that has a circular cutting edge. The disks are preferably co-planar and closely adjacent to each other along a center longitudinal axis of the frame, and are not powered. When the disks are moved against standing vegetation with stalks or trunks, they rotate and sever the vegetation. Additionally, a lift plate is provided on the trailing side of the disks so after severing the vegetation the lift plate lifts the trunks of trees or stalks or the like upwardly from the disks. The lift plate is inclined to tend to cause the trees to tilt outwardly. Support arms can be closed to hold the cut tree or other vegetation in the frame until the arms are released.

12 Claims, 6 Drawing Sheets

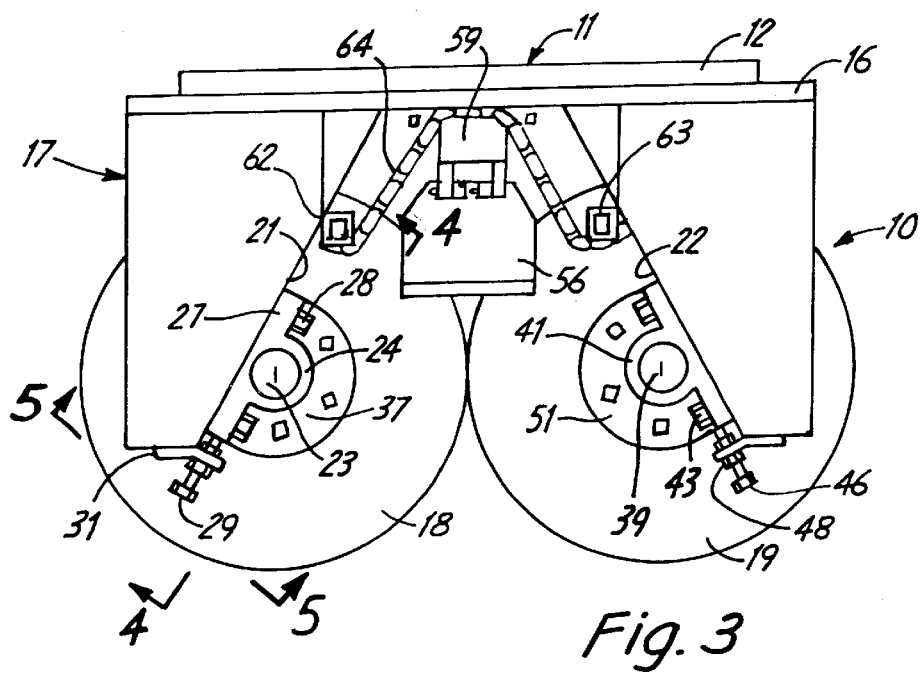
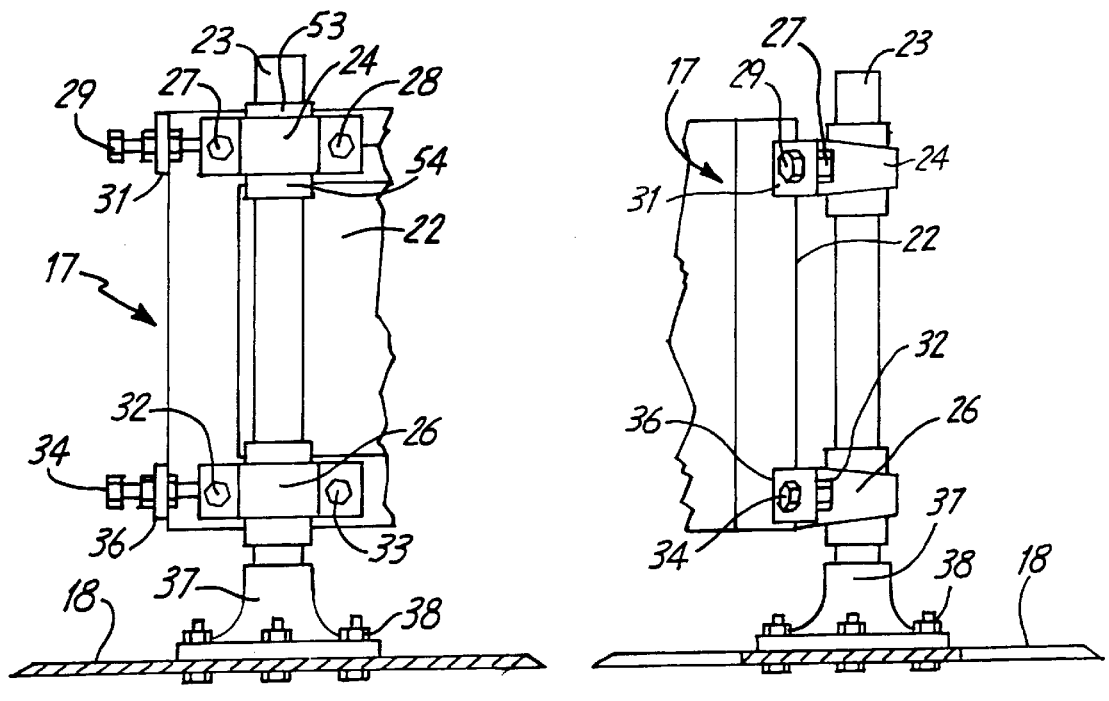

CUTTING ATTACHMENT

CROSS REFERENCE TO RELATED APPLICATION

This application claims priority on provisional application Ser. No. 60/150,203, filed Aug. 20, 1999, for CUTTING ATTACHMENT.

BACKGROUND OF THE INVENTION

The invention relates to tree and brush cutting attachments for skid steer vehicles and tractors. The cutting attachment of the present invention has circular disks operable to cut tree trunks and brush.

Powered cutting attachments for severing trees, stumps, and brush (vegetation) using skid steer vehicles and tractors are used to clear land and harvest trees. The attachments have either a single cutting disk or a pair or cutting disks driven with hydraulic fluid operated motors. Examples of tree cutting attachments are disclosed in the following U.S. patents.

U.S. Pat. No. 3,364,964 discloses a tree cutting machine having a circular blade rotatably mounted on an arm that swings about an upright axis. A hydraulic cylinder pivots the arm to move the blade relative to a foot member to cut a tree trunk.

U.S. Pat. No. 4,445,557 discloses cutting apparatus having a pair of circular cutting disks rotatably mounted on a pair of arms. The disks are inclined downwardly toward each other to cut a tree trunk below the surface of the ground. Hydraulic motors rotate the disks.

U.S. Pat. No. 4,467,849 discloses a tree stump cutter having a pair of circular blades secured to upright shafts. Hydraulic motors coupled to the upper ends of the shafts rotate the blades which cut a tree stump.

SUMMARY OF THE INVENTION

The cutting attachment of the invention is used with a tractor, such as a skid steer vehicle or track tractor, to clear land of trees, stumps, and brush. Diseased trees and culls from nursery fields can be removed with a minimum of time and labor. Christmas tree harvesting is accomplished with minimum damage to the tree.

The cutting attachment has a frame secured to a hitch assembly adapted to be connected to a motor vehicle. A pair of horizontal disks secured to upright shafts or axles mounted in bearings attached to the frame operate to sever a tree from the ground as the disks are moved into the tree trunk. Power units, such as motors and chain drives are not used to rotate the disks. The disks are free to rotate about the upright axes of the shafts from external forces and will rotate to slice into a tree trunk. An inclined plate mounted on the frame. above the disks lift the cut tree from the disks and the inclined wall provide a force tending to tilt the tree outwardly. The tree is held in an upright position by arms connected to an upright fence. the fence prevents the cut tree from falling toward the operator of the motor vehicle hitched to the cutting attachment when the arms are opened or released. The inclined plate tends to tilt the tree outwardly.

The inclined plate in a modified form of the invention is secured in place and supported by a longitudinal rib that protrudes into the narrowing space between the disks on the trailing side of the disks. The lifting action holds tree trunks away from the freely rotating disks.

BRIEF DESCRIPTION OF THE DRAWINGS

FIG. 3 is a sectional elevational view taken along line 3—3 of FIG. 2;

FIG. 4 is a sectional view taken along line 4—4 of FIG. 3;

FIG. 5 is a sectional view taken along line 5—5 of FIG. 3;

DETAILED DESCRIPTION OF THE ILLUSTRATIVE EMBODIMENTS

Figure 1:
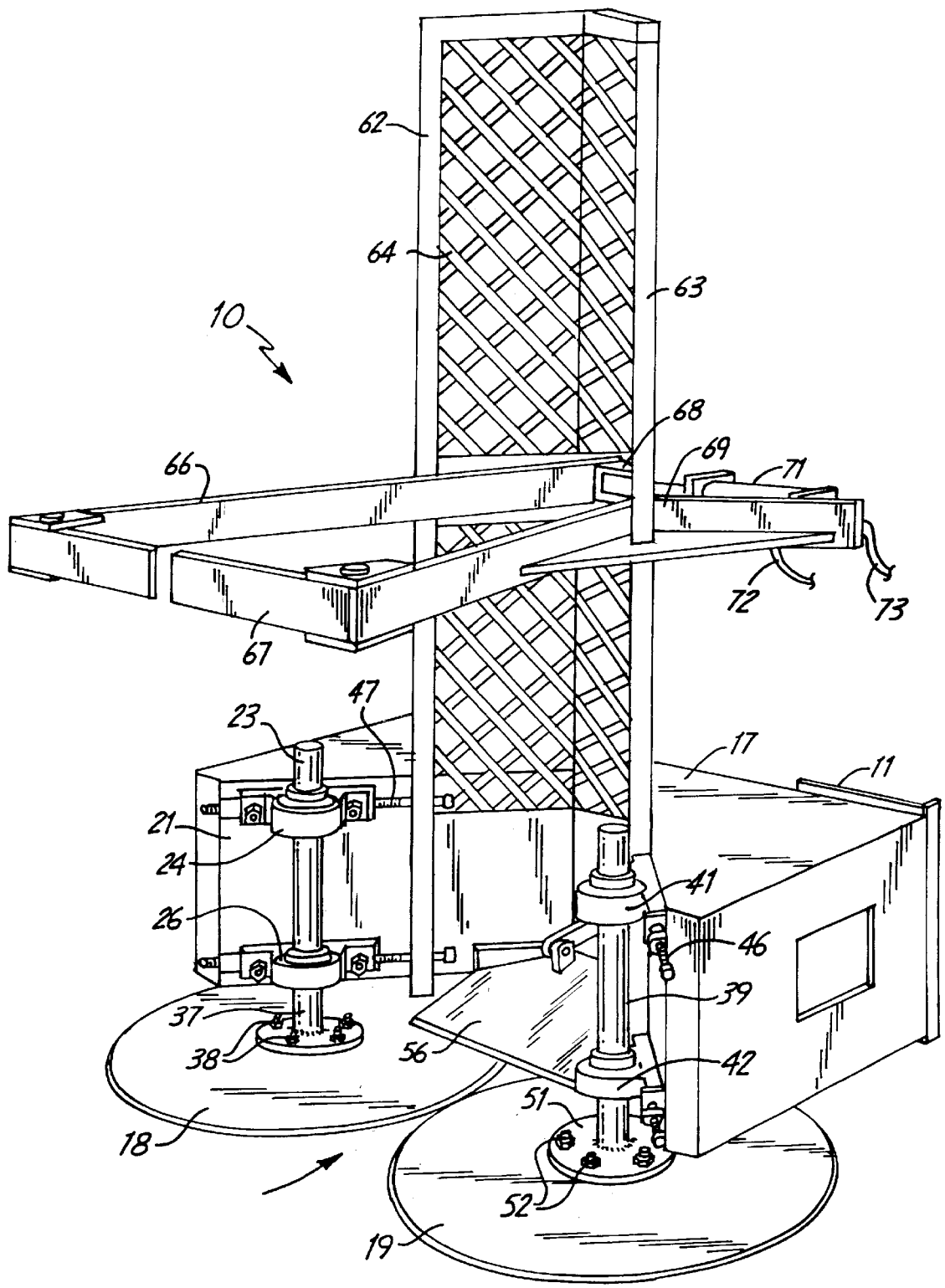
FIG. 1 is a perspective view of the cutting attachment of the invention.
Figure 2:
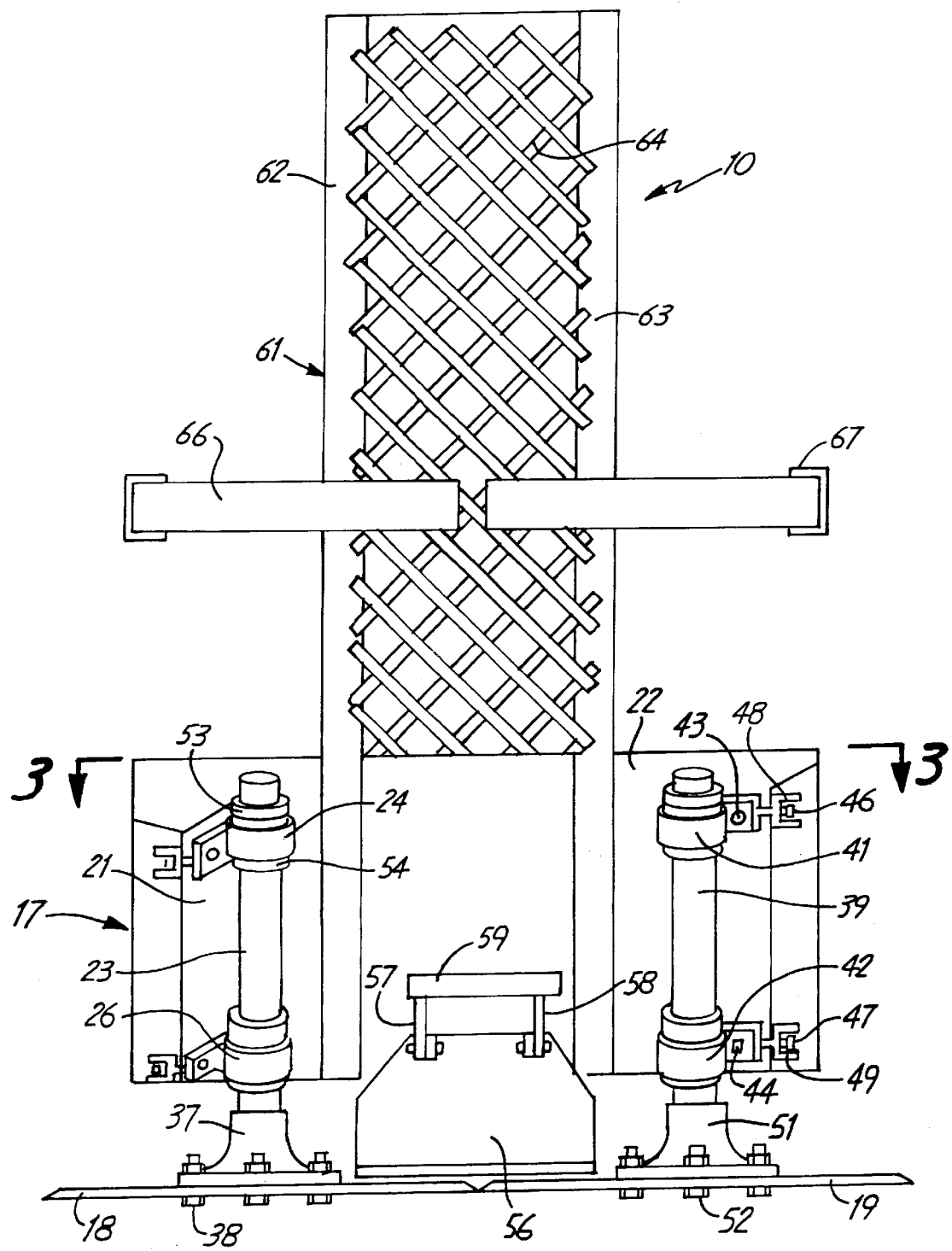
FIG. 2 is a front elevational view of the cutting attachment of FIG. 1.
Figure 6:
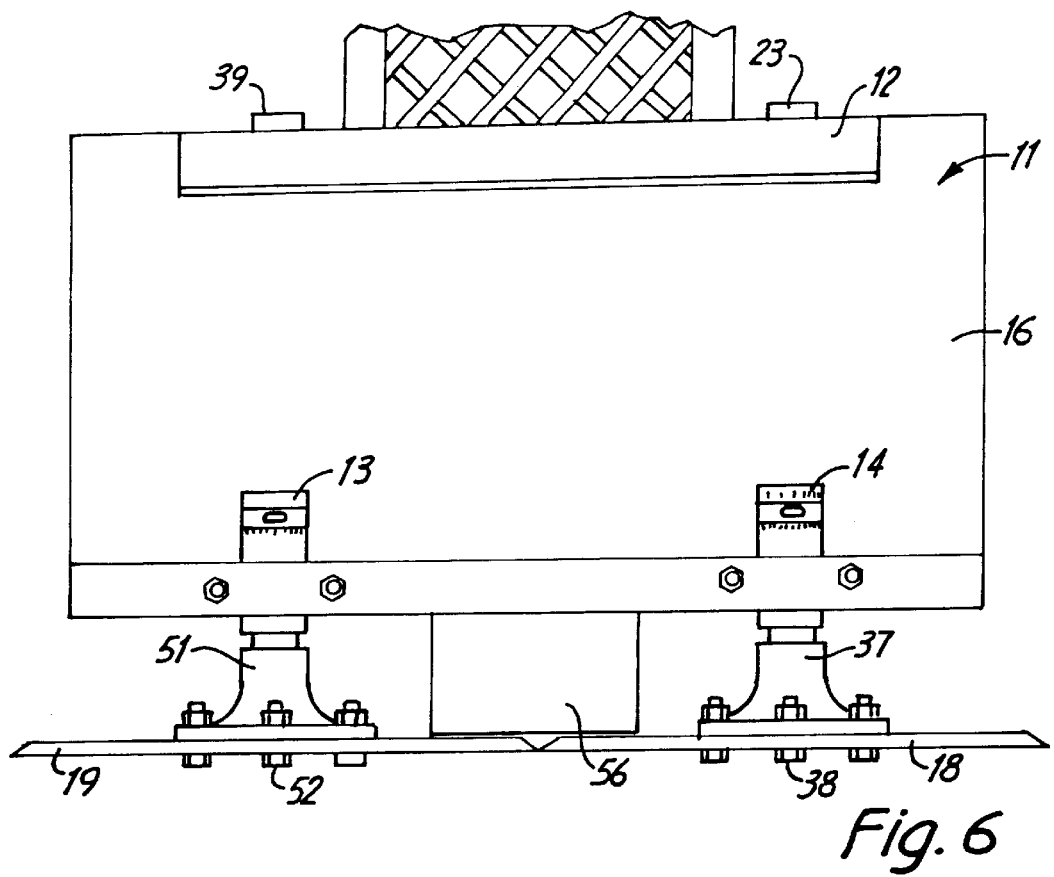
FIG. 6 is a rear elevational view of FIG. 3.
Figure 7:
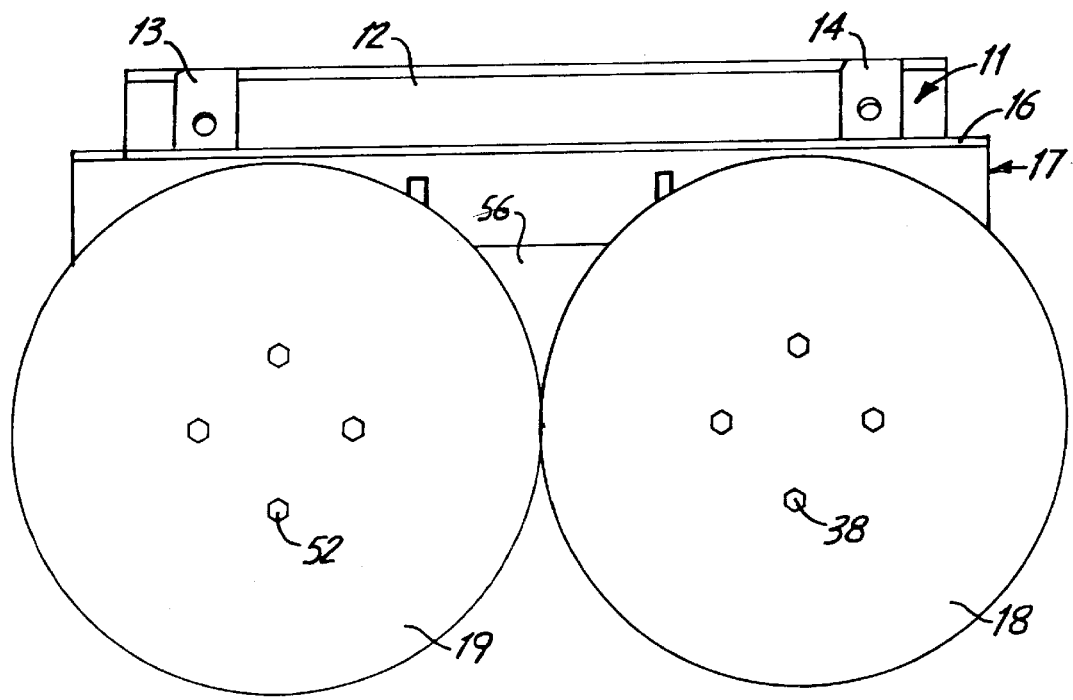
FIG. 7 is a bottom plan view of FIG. 2.

The cutting attachment 10, shown in FIGS. 1 and 2, has a hitch assembly 11 adapted to be connected to lift arms of a skid steer loader or a tractor. An example of a skid steer hitch assembly is disclosed in U.S. Pat. No. 4,749,048. As shown in FIGS. 6 and 7, hitch assembly 11 has a horizontal downwardly inclined lip 12 and ears 13 and 14 secured to a back plate 16. The lip and ears are used with a quick attachment arrangement for mounting on a skid steer loader, as shown in U.S. Pat. No. 4,749,048.

Plate 16 is the back wall of a frame 17. As shown in FIG. 3, frame 17 rotatably supports a pair of circular cutters or disks 18 and 19 operable to cut tree trunks, stumps, and brush stalks above or below the ground. Motors are not used to rotate disks 18 and 19 and thus they are unpowered. Disks 18 and 19 are flat circular metal members. Each disk 18 and 19 has a continuous outer peripheral cutting edge. Frame 17 has upright inside walls 21 and 22 which diverge outwardly from back plate 16. The walls 21 and 22 form a "V" shape that is open in the direction of movement.

As shown in FIGS. 2, 4 and 5, a first upright shaft 23 rotatably mounted in bearings 24 and 26 is connected to disk 18. Bolts 27 and 28 attach bearing 24 to an inner side wall 21 of one leg of the V-shaped frame 17. A bearing adjustment bolt 29 mounted on a bracket 31 secured to frame 17 bears against bearing 24 to adjust and retain the horizontal location of bearing 24 on frame 17. Bearing 26 is attached to frame 17 with bolts 32 and 33. A bearing adjusting bolt 34 mounted on bracket 36 secure to frame 17 engages bearing 26 to adjust and retain the horizontal location of bearing 26 on frame 17. Bearings 24 arid 26 hold shaft 23 in an upright orientation and cutting disk 18 in a generally horizontal position. Disk 18 is secured to the lower end of shaft 23 with a hub 37 and bolts 38. The location of bearings 24 and 26 can be adjusted to locate disk 18 in close relation to disk 19.

A second upright shaft 39 is rotatably mounted in bearings 41 and 42. Bolts 43 and 44 attach bearings 41 and 42 to an inner side wall 22 of a second leg of the V-shaped frame 17. Bearing adjusting bolts 46 and 47 mounted on brackets 48 and 49 adjust the location of bearings 41 and 42 on frame 17. The locations of bearings 24, 26 and 41, 42 on frame 17 are adjusted to locate the adjacent peripheral edges of disks 18 and 19 in close relationship. A hub 51 attached to the lower end of shaft 39 is connected with bolts 52 to disk 19. Collars 53 and 54 secured to shafts 23 and 39 above and below bearings 24, 26, 41 and 42 fix the vertical locations of shafts 23 and 39 thereby preventing up and down movements of shafts 23 and 39 and retaining disks 18 and 19 in a common horizontal plane. The adjacent peripheral edges of disks 18 and 19 are close to the longitudinal centerline of attachment 10. The edges of the disks are closest in the region along a plane defined by the axes of the shafts 23 and 38. The circular disks form a tapered forward facing bight, where the circular edges converge and a trailing side bight on the side toward the closed end of the V-shaped frame.

An upwardly and rearwardly inclined plate 56 located behind the adjacent peripheral edges of disks 18 and 19 overlies the tracking side bight formed between the disks and lifts the cut tree away from disks 18 and 19. The incline of the plate also tends to tilt the upper end of a tree forwardly away from the operator. A pair of arms 57 and 58 pivotally connect plate 56 to frame 17. A transverse plate or member 59 anchors arms 57 and 58 to frame 17.

An upright fence 61 extends vertically from frame 17 to prevent the cut tree from falling back toward the vehicle operator. Fence 61 has a pair of upright posts 62 and 63 and an open mesh member 64, such as expanded metal sheet material, extended between and secured to posts 62 and 63. The lower ends of posts 62 and 63 are secured to frame 17 to maintain the upright position of fence 61.

As shown in FIGS. 1 and 2, a pair of arms 66 and 67 are pivotally mounted on fence 61 to grasp or release a cut tree. Arms 66 and 67 are generally right angle beams having longitudinal side members and front transverse members. The transverse members face each other to enclose a tree between the arms 66 and 67. A first upright pivot 68 pivotally secures arm 66 to post 62. A second upright pivot 69 pivotally connects arm 67 to post 63. A double acting hydraulic fluid operated cylinder 71 connected to the rear ends of arms 66 and 67 operates to pivot arms 66 and 67 between open and closed positions. In open position a tree will pass between the arm, and when the arms are closed, the arms will hold a tree in place. Fluid lines 72 and 73 couple cylinder 71 to a source of fluid under pressure and valve controls (not shown) for controlling the flow of fluid to and from the cylinder. Retracting the cylinder 71 causes the arms to open, while extending the rod of the cylinder will close the arms. The valves and source of fluid under pressure are provided by auxiliary functions of a skid steer loader. The angled lift plate 56 will tilt a tree to discharge it when the arms 66 and 67 are opened.

In use, hitch assembly 11 is connected to a prime mower or motor vehicle, such as a skid steer loader. The attachment 10 is lowered to locate disks 18 and 19 adjacent the ground or below ground. The vehicle is moved forward and aligned with a tree, stump, or brush to be cut to locate the tree aligned between disks 18 and 19, that is aligned with the longitudinal axes or centerline of the frame. Continued forward movement of the vehicle forces the disks 18 and 19 into the trunk of the tree. The disks 18 and 19 rotate about the upright axes of shafts 23 and 39 during the cutting of the tree trunk from the forward movement of the vehicle and reaction of forces from the tree trunk. The tree is severed as it passes into the leading edge bight portion and across the narrowest portion of the space between the disks. The cut tree is lifted from disks 18 and 19 by the inclined plate 56 which serves as a ramp for the bottom of the tree trunk. The arms 66 and 67 are operated to surround the tree to hold the tree adjacent fence 61 before the tree falls. The fence 61 prevents the tree from falling back toward the vehicle operator. The arms can be opened where the tree is to be placed. The plate 56 tends to tilt the tree outwardly as the arms are opened. No power is required for the cutting action. A hydraulic cylinder for operating the arms is all the power required.

Figure 8:
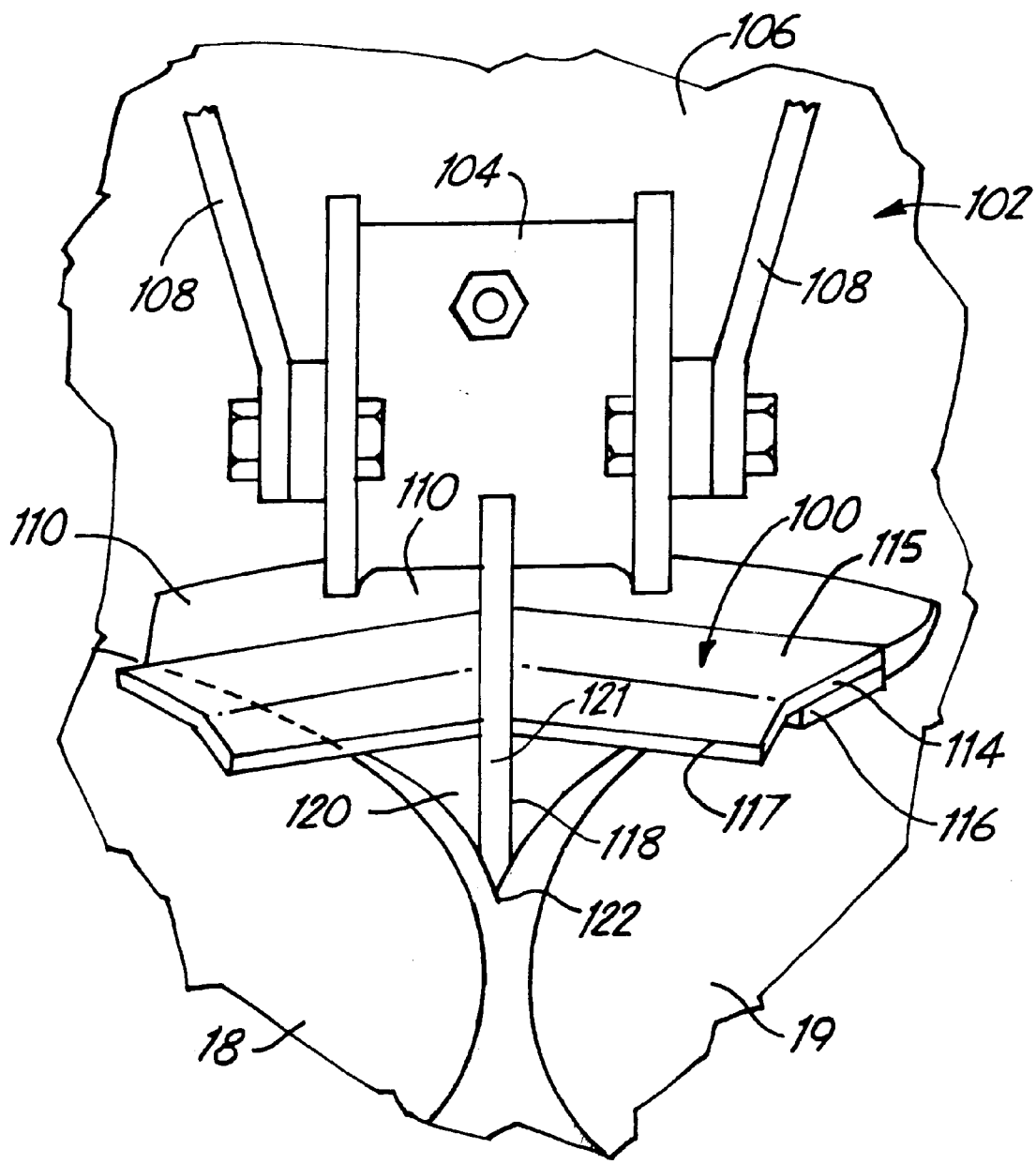
FIG. 8 is a fragmentary front perspective view of a modified lift plate used with the present invention.
Figure 9:
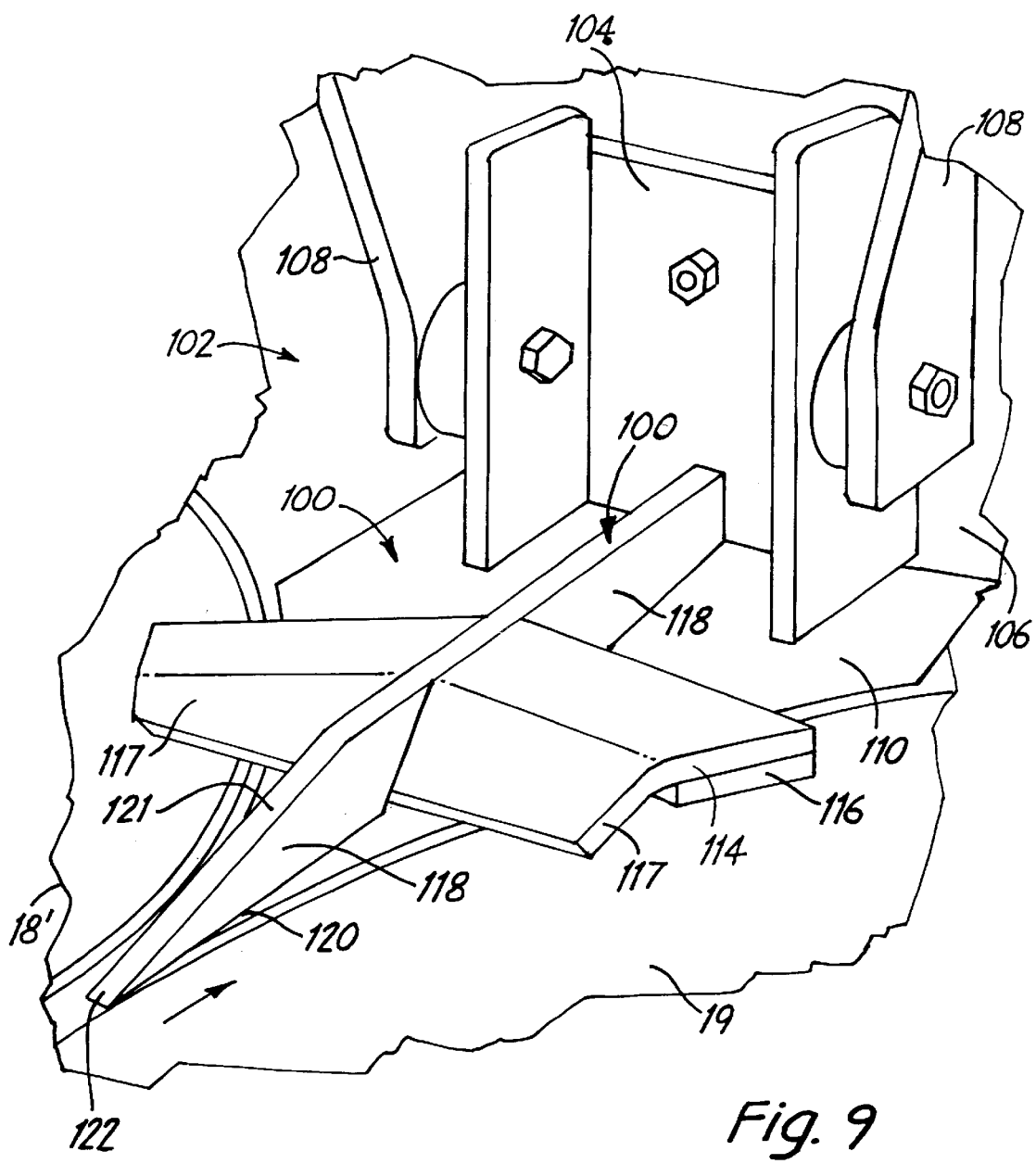
FIG. 9 is a fragmentary side perspective view of the lift plate of FIG. 8.

The inclined plate can be modified to provide the function of lifting tree trunks from the rotating disks. In FIGS. 8 and 9 a modified inclined lifting plate 100 is shown installed on a frame 102 identical to frame 17. The frame would include the V-shaped side members and the arms 66 and 67 and fence 61 are provided. The disks 18 and 19 are the same as before and are freely rotatable in bearings as shown.

The lifting plate 100 includes a support bracket 104 rigidly supported on the back plate 106 of the frame 102. The bracket 104 can be braced with braces 108. The bracket 104 is secured to a fixed plate 110 that in turn supports a lift plate section 114 that has a rear portion 115 that is raised up from plate 110 with a spacer 116 that has an inclined leading flange 117 that has sections on each side of a longitudinal rib 118. The support plate 110 supports the rib 118. The support plate 110 has a tapered leading end section 120 that fits into the recess or bight between the disk 18 and 19 on the rear or trailing side of the disks. The support plate 110 is on the same plane as the disks 18 and 19. The rib 118 tapers downwardly along an edge 121 to the leading end point 122 that is near the convergence of the disks 18 and 19. The rib and plate can be made of high performance composite materials or plastics that resist abrasion, as well as metal. The bracket 104, support plate 110, lift plate 114 and rib 118 are rigidly secured together and rigidly held on the frame 102.

The plate 100 has the angled surfaces that lift the tree trunks or vegetation away from the disks as the vehicle moves forwardly.

The term vegetation is to include trees, brush, and heavy stalked plants that require severing.

There has been shown and described an embodiment of the cutting attachment of the invention. Changes in the structures and arrangements of structure is can be made by persons skilled in the art without departing from the novel and advantageous features of the invention.

What is claimed is:

1. A cutting attachment for severing upright vegetation comprising a frame, a pair of cutting disks rotatably mounted on said frame for rotation about generally upright axes, said disks having circular peripheral edges that are closely adjacent to each other at diameters thereof to form a bight portion on a leading side when moved in a direction transverse to a plane defined by the axes of rotation of the disks, the disks being freely rotatable and unpowered and movable to engage and sever vegetation passing between the axes of the disks.

2. The cutting attachment of claim 1, wherein the frame is adapted for mounting onto a vehicle for movement in a path transverse to the plane defined by the axes of the disks.

3. The cutting attachment of claim 1 and a lift plate mounted on the frame and overlying portions of said disks that are on a trailing side of the disks with respect to the direction of movement for severing vegetation.

4. The cutting attachment of claim 3, wherein said lift plate is inclined upwardly and rearwardly relative to a plane defined by the disks.

5. The cutting attachment of claim 4, wherein said disks are substantially coplanar.

6. The cutting attachment of claim 1, wherein said frame comprises a pair of side members that are spaced apart and support the disks on shafts rotatable about upright axes of outer ends, and tapered together toward a center portion to form a "V" shaped opening in the direction of movement of the frame for cutting vegetation.

7. The cutting attachment of claim 6, wherein said frame includes an upright portion on a trailing side of the disks that extends sufficiently high to support vegetation cut by the disks.

8. The cutting attachment of claim 7 and a pair of holding arms mounted on said frame and adapted to encircle vegetation that is being cut by the cutting attachment.

9. A cutting device for cutting vegetation that has upright standing trunks, comprising a frame having portions attachable to a prime mover for movement along the ground, said frame having a pair of diverging walls with a wide end of the frame facing in a direction of movement of the frame, the diverging walls of the frame having facing interior surfaces each supporting an upright shaft thereon with the shafts spaced apart, each of the shafts mounting a disk having circular cutting edges facing in the direction of movement of the frame, the edges of said disks being closely adjacent to each other in center portions of the frame, and generally in the location along a plane defined by the axes of the rotation of the shafts, said disks being freely rotatable and unpowered and forming a forward bight that is moveable to engage vegetation and sever vegetation as the disk rotates only from external forces from vegetation engaged as the frame moves, without power being applied to the shafts.

10. The cutting device of claim 9 and a lift plate on a trailing side bight formed by said disks and overlying portions of said disks adjacent a center longitudinal axis between the discs, said lift plate being adapted to engage trunks of vegetation being cut by said cutting attachment and lifting said trunks as the vegetation move toward the closed end of the diverging walls of the frame.

11. The cutting device of claim 10, wherein the lift plate includes a center rib extending along the longitudinal axis tapering upwardly in rearward direction to a level of a portion of the lift plate.

12. The cutting device of claim 10, wherein the lift plate is rigidly attached to the frame.

* * * * *